United States Patent [19]

Frauenglass et al.

[11] 4,038,475
[45] July 26, 1977

[54] HIGHLY STABLE ANAEROBIC COMPOSITIONS

[75] Inventors: Elliott Frauenglass, Newington; Gerhardt P. Werber, Guilford, both of Conn.

[73] Assignee: Loctite Corporation, Newington, Conn.

[21] Appl. No.: 608,655

[22] Filed: Aug. 28, 1975

Related U.S. Application Data

[63] Continuation of Ser. No. 506,132, Sept. 24, 1974, abandoned, which is a continuation of Ser. No. 318,132, Dec. 26, 1972, abandoned, which is a continuation of Ser. No. 112,722, Feb. 14, 1971, abandoned, which is a continuation-in-part of Ser. No. 20,795, March 18, 1970, abandoned.

[51] Int. Cl.$^2$ .................. C08F 120/20; C08F 120/34
[52] U.S. Cl. .................................... 526/328; 526/217; 526/220; 526/230

[58] Field of Search ............... 260/89.5 R, 89.5 A; 526/217, 220, 230, 328

[56] References Cited

U.S. PATENT DOCUMENTS

| | | | |
|---|---|---|---|
| 3,218,305 | 11/1965 | Krieble | 260/89.5 |
| 3,565,877 | 2/1971 | Lomonaco et al. | 260/88.7 |

*Primary Examiner*—John Kight, III
*Attorney, Agent, or Firm*—Jean B. Mauro

[57] ABSTRACT

Anaerobic compositions possessing high stability, and which are capable of extremely rapid speed of cure, are prepared by adding to a combination of a polymerizable acrylate ester monomer and a peroxy polymerization initiator therefor, a small but effective amount of a soluble metal chelating agent which does not materially affect the speed of cure of the anaerobic composition when used on metal surfaces.

13 Claims, No Drawings

HIGHLY STABLE ANAEROBIC COMPOSITIONS

This is a continuation of application Ser. No. 506,132 filed Sept. 24, 1974, now abandoned, which is a continuation of application Ser. No. 318,132 filed Dec. 26, 1972, now abandoned, which was a continuation of application Ser. No. 112,772 filed Feb. 14, 1971, now abandoned, which in turn was a continuation-in-part of application Ser. No. 20,795 filed Mar. 18, 1970, also now abandoned.

BACKGROUND OF THE INVENTION

Anaerobic compositions are mixtures of polymerizable acrylate ester monomers, and peroxy polymerization initiators therefor, the cure of which is inhibited by oxygen. These materials remain in the uncured state as long as adequate contact is maintained with atmospheric oxygen, such as in a partially empty polyethylene bottle. When, however, the composition is placed between metal or other impervious surfaces, contact with oxygen is prohibited and within a relatively short period of time the polymerization reaction commences. These compositions have found their greatest utility as adhesives and sealants (hereinafter frequently referred to jointly as adhesives) since, unlike prior adhesives, cure does not depend upon evaporation of a volatile solvent or the mixing of two reactive components at the time of use.

The earliest disclosed commercially acceptable anaerobic compositions are those in U.S. Pat. No. 2,895,950 to Krieble, issued July 21, 1959. Other typical disclosures of related or improved anaerobic compositions may be found, for example, in U.S. Pat. Nos. 3,043,820 to Krieble, issued July 10, 1962; 3,046,262 to Krieble, issued July 24, 1962; 3,218,305 to Krieble, issued Nov. 16, 1965; and 3,435,012 to Nordlander, issued Mar. 25, 1969.

While the one-component anaerobic adhesives and sealants have gained wide acceptance in commercial practice, they have not realized their full potential because of what heretofore have been certain inherent shortcomings. They are precatalyzed (i.e., a peroxy initiator is included as an inherent part of the composition), and in nearly all cases contain latent accelerators of free radical polymerization. These latent accelerators are substances which, while not initiating polymerization, do increase the rate of polymerization once it has been started by the peroxy initiator. Such ingredients, in combination with other influences which were not known or clearly understood, created an erratic and recondite danger of spurious polymerization in the bottle or elsewhere prior to the time of intended use. The problems were particularly acute when dealing with compositions containing the more active latent accelerators of polymerization.

Attempts to overcome this problem have followed two common paths. First, polymerization inhibitors, such as quinone type inhibitors, have been used in conjunction with the anaerobic compositions. Wyile an aid in the reduction of spurious polymerization, this approach has not eliminated the problem. Moreover, when more sophisticated latent accelerators were discovered (such as those which will be discussed more fully hereinafter), it was found that the inhibitors did adversely affect the speed of cure of the composition in use. Secondly, in order to provide a suitably stable product, less active latent accelerators commonly were used, thus removing from the anaerobic compositions some of the potential speed of cure which could be obtained otherwise.

It recently has been hypothesized that a significant portion of the unpredictability inherent in anaerobic compositions is traceable to the presence of metal contamination inherent in the starting materials, or acquired during processing. Based on this hypothesis, attempts were made to eliminate the problem, such as by greater care in the manufacturing operations for the anaerobic composition and starting materials therefor, and attempts to reduce the metal content in such products. While some of the processes did provide certain benefits, none was found to be an acceptable solution. It now appears that, in fact, levels of metal contamination substantially below that which can be removed by conventional processing are more than enough to cause the serious stability and spurious polymerization problems previously noted, particularly anaerobic compositions which contain active latent polymerization accelerators. In some systems, metal levels substantially below one part per million are still significant. Thus, the depths of this problem are substantially greater than has been thought previously. Hence, the reason for the lack of success to date in finding an adequate solution.

Among other things, this invention is designed to provide anaerobic compositions and processes for preparing them which materially reduce or substantially eliminate the above-described problems of the prior art, greatly simplify the manufacture of anaerobic compositions, and make available in such processes and compositions the use of higher levels of active polymerization accelerators than has been commercially possible heretofore.

THE INVENTION

This invention deals with anaerobic compositions comprising polymerizable acrylate ester monomers in combinations with peroxy polymerization initiators therefor. Incorporated in such composition is a small but effective amount of a chelating agent which does not have a material adverse effect on the speed of cure of the polymerizable composition in use. This invention also deals with a process for improving anaerobic compositions which comprises adding to such composition a small but effective amount of the above-described metal chelating agents, and with processes for bonding and/or sealing impervious surfaces by the use of such compositions.

While significant benefits are obtained in the form of increased stability of any anaerobic composition which contains the above-described metal chelating agents, the major benefit provided by this invention is the ability to use more active and higher levels of latent polymerization accelerators. It is believed that the inherently more stable nature of the anaerobic compositions described herein makes possible the use of such accelerators.

DISCUSSION OF THE INVENTION AND ITS PREFERRED EMBODIMENTS a. The Chelating Agents

"Chelation" as used herein refers to the generally accepted meaning of that term, a process wherein a metal atom is complexed into a heterocyclic ring as a result of the formation of coordination bonds between the metal atom and two or more atoms of the chelating agent. Each molecule of chelating agent which is bound to the metal atom commonly is called a "ligand", and the donor atoms which are bonded to the metal when forming the chelate ring are designated "ligand atoms". Numerous atoms have been identified as capable of participating in the formation of this chelate compound, such as chlorine, bromine, iodine, phosphorus, arsenic and selenium, but by far the most common of such atoms are nitrogen, oxygen and sulfur.

The chelating agents which have been found useful in the compositions of this invention are those which do not materially affect the speed of cure of the anaerobic composition at the time of its use. While the exact mechanism by which the chealating agent accomplishes the effective chelation of the metal without adversely affecting the speed of cure of the anaerobic composition is not clearly understood, and hence applicants do not wish to be bound to any particular theory, it is believed that certain chelating agents react so rapidly with metal atoms that the natural catalytic effect which is derived from trace metal contamination of most surfaces, and particularly significant acceleration provided by most metal surfaces, is reduced or eliminated by co-action between the chelating agent and the metal on the surface, apparently creating a barrier to the acceleration process.

Of particular importance are zinc, cadmium, stainless steel and other metallic surfaces of reduced catalytic or noncatalytic nature. Even trace amounts of some chelating agents materially hinder the cure of anaerobic compositions on such surfaces.

To determine relative suitability for purposes of this invention, two simple tests may be used. An anaerobic composition is prepared using the desired monomer, initiator, and any other desired ingredients, including the latent accelerators of polymerization, but deleting the chelating agent. The anaerobic composition is divided into two portions, and 100 parts per million by weight of the chelating agent in question is dissolved in one of the portions. Each of the two portions then is subjected to the two tests which hereinafter will be referred to as the "Standard Stability Test" and the "Fixture Time Test".

Standard Stability Test

In the Standard Stability Test, a standard 3 inch by ⅝ inch diameter test tube is half filled with the anaerobic composition; the tube then is suspended in a constant temperature bath maintained at 180° F. The length of time from the placing of the test tube in the bath to the time when the first gellation is observed in the tube is noted and used as a measure of the stability of the composition.

Fixture Time Test

In the Fixture Time Test, several drops of the anaerobic composition are placed on the threads of a standard steel ⅜ inch-24 nut and bolt, and the two are assembled. Periodically, the nut is moved slightly relative to the bolt to determine when polymerization has taken place. When it is no longer possible to turn the nut relative to the bolt by hand, the total elapsed time is noted and this is used as a measure of cure speed.

The results for the portion of anaerobic composition containing the chelating agent are compared to those for the portion without chelating agent to see if a proportionately greater increase in stability has occurred relative to the increase in fixture time. The preferred chelating agents are those which show at least about a four-fold increase in stability, while having no more than about a two-fold increase in fixture time.

While not wishing to be bound to any particular theory, it is believed that the relative reactivity of the active metal on the surfaces to be bonded with the polymerization initiator must not be disproportionately small relative to that metal's reactivity toward the chelator. As an apparently acceptable guideline, letting the reaction rate constant for the former be designated $K_I$, and the reaction rate constant for the latter be designated $K_c$, the ratio of $K_c/K_I$ should be about 10 or smaller.

The preferred class of chelating agents which have been found are those which possess a combination of oxygen and nitrogen ligand atoms, such as the $\alpha$- and $\beta$-aminocarboxylates. For example, an outstanding class of chelating agents for use in the compositions of this invention are the soluble polycarboxylated polyamines, such as the sodium derivatives of polycarboxylated alkylenediamines, e.g., tetrasodium ethylenediamine tetraacetic acid. Other effective and preferred chelating agents of this type are o-aminophenol and 8-hydroxyquinoline.

One class of chelating agents wherein many non-usable chelating agents are found, is that wherein all ligand atoms are nitrogen. Typical examples of chelating agents in this class are dipyridyl, tripyridyl, phenanthroline, 1,2-bis($\alpha$-pyridylmethylene-amino)-ethane and 1,2-bis(6'-methyl-2'-pyridylmethyleneamino)-ethane.

The amount of chelating agent used will vary to some extent with the specific combination of chelating agent and anaerobic composition involved. As a general rule however, benefits can be detected with chelator levels as low as about 1-5 parts per million by weight in some compositions. A preferred lower limit is about 10 parts per million. At the upper end of the range, little if any benefit is attained with levels above about 1000 parts per million by weight, and deleterious effects on speed cure may be encountered. A preferred upper limit is about 500 parts per million.

It should be noted that as the above defined ratio of $R_c/R_I$ increases within the operable range for the compositions of this invention, the preferred upper limit becomes progressively lower. The active metal on the surfaces to be bonded (ferrous ion in the majority of cases), must remain available to assist in the initiation process.

b. The Monomers

The most desirable monomers for use in the anaerobic compositions are polymerizable acrylate esters. When used in the process of this invention, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula (1)

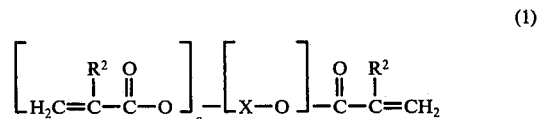

wherein $R^2$ is a radical selected from the group consisting of hydrogen, halogen and alkyl of from 1 to about 4 carbon atoms; q is an integer equal to at least 1, and preferably equal to from 1 to about 4; and X is an organic radical containing at least two carbon atoms and having a total bonding capacity of q plus 1.

wherein each of $Y^1$ and $Y^2$ is a hydrocarbon group containing at least 2 carbon atoms, and preferably from 2 to about 10 carbon atoms, and Z is a hydrocarbon group thus the soluble chelator has ligand atoms other than nitrogen ligand atoms of the $>C=N-$ type containing at least 1 carbon atom, and preferably from 2 to about 10 carbon atoms. Another class of useful polyacrylate ester monomers are the isocyanatemonoacrylate reaction products described in U.S. Pat. No. 3,424,988 to Toback and Gorman, issued Feb. 4, 1969.

The most highly preferred acrylate esters which can beuused in the compositions disclosed herein are polyacrylate esters which have the following general formula:

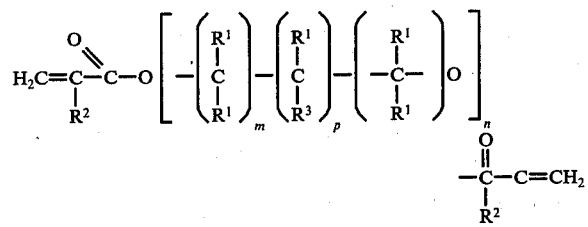

(2)

wherein $R^1$ represents a radical selected from the group consisting of hydrogen, lower alkyl of from 1 to about 4 carbon atoms, hydroxy alkyl of from 1 to about 4 carbon atoms, and

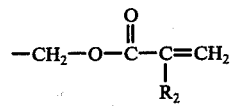

$R^2$ is a radical selected from the group consisting of hydrogen, halogen, and lower alkyl of from 1 to about 4 carbon atoms; $R^3$ is a radical selected from the group consisting of hydrogen, hydroxyl, and

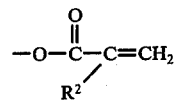

m is an integer equal to at least 1, e.g., from 1 to about 15 or higher, and preferably from 1 to about 8 inclusive; n is an integer equal to at least 1, e.g., 1 to about 40 or more, and preferably between about 2 and about 10; and p is one of the following: 0, 1.

The polymerizable polyacrylate esters utilized in accordance with the invention and corresponding to the above general formula are exemplified by, but not restricted to, the following materials: di-, tri- and tetrethyleneglycol dimethacrylate; dipropyleneglycol dimethacrylate; polyethyleneglycol dimethacrylate; polypropyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is preferable to use an ester which has a relatively polar alcoholic moiety. Such materials are less volatile than low molecular weight alkyl esters and, more important, the polar group tends to provide intermolecular attraction in the cured polymer, thus producing a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxethyl acrylate, hydroxypropyl methacrylate, t-butylaminoethyl methacrylate, cyanoethylacrylate, and chloroethyl methacrylate.

Other acrylates can be used in the anaerobic compositions. However, when other acrylates are used, they preferably are used in combination with one or more of the polyacrylate and monoacrylate ester monomers described above. Most preferably, polyacrylates having the chemical formula (2), given above, comprise at least about 50 percent by weight of the acrylates used since these monomers have been found clearly superior in anaerobic compositions.

c. The Initiators

As indicated above the anaerobic compositions as discussed herein are prepared by mixing a peroxy initiator with one or more acrylate esters as described above. While certain peroxides (such as dialkyl peroxides) have been disclosed as useful initiators in, e.g., U.S. Pat. Nos. 3,419,512 to Lees, issued Dec. 31, 1968 and 3,479,246 to Stapleton issued Nov. 18, 1969, the hydroperoxides are highly superior and constitute a highly preferred embodiment.

The real benefit of the non-hydroperoxide initiators is as a co-initiator with the hydroperoxides to make the cure properties of the anaerobic composition more universal.

Hydrogen-peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexl peroxide and t-butyl perbenzoate, respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferably is an alkyl, aryl or aralkyl hydrocarbon group containing from about 3 to about 12 carbon atoms. Naturally $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the general formula (2) above. The organic hydroperoxide initiators which are used commonly comprise less than about 10 percent by weight of the combination of polymerizable monomer and initiator, since above that level adverse effects on the strength and durability of the cured composition may be experienced. Preferably the hydroperoxide initiator comprises from about 0.1 percent to about 5 percent by weight of the combination.

d. Accelerators

While the benefits of this invention are achievable in all anaerobic compositions in the form of increased stability, they are seen most clearly in anaerobic compositions which contain polymerization accelerators. As explained above, such accelerators should be incorporated in the compositions to obtain rapid cure at the time of intended use. This avoids the need to add accelerators either to the anaerobic composition or the surfaces to be bonded, sealed, etc., at the time of use.

The most efficient of the polymerization accelerators are those which are redox activated. These frequently create stability problems when used to prepare anaerobic compositions in the prior art fashion because of the presence of metal contamination as discussed above. When used as disclosed herein, the redox activated accelerators can be used safely, and even can be used at higher levels to produce greater speed of cure. It is in this respect that some of the most important advantages of this invention are realized.

The most common of the polymerization accelerators suitable for incorporation in anaerobic composition are discussed below and the benefits of the invention are achievable with any of such accelerators. It should be noted however that large numbers of polymerization accelerators are known in the art, and the broad concept of this invention is intended to encompass any polymerization accelerator which can be incorporated in the anaerobic composition without destroying the essential characteristics of such composition.

Among the earliest of the polymerization accelerators used in anaerobic composition were amines. The most commonly used are tertiary amines such as tributylamine and triethylamine. Essentially the entire class of tertiary amines can be used in such compositions, and the class may be broadly represented by the formula $$NR^5R^6R^7$$

wherein each of $R^5$, $R^6$ and $R^7$ is a hydrocarbon group containing up to about 10 carbon atoms. Naturally the hydrocarbon groups can contain any substituent or linkage which does not adversely affect the workability of the amine to perform its intended function. Preferably, each of $R^5$, $R^6$ and $R^7$ is an alkyl, aryl or aralkyl group containing up to about 8 carbon atoms.

The N,N-dialkyl aryl amines are particularly effective tertiary amines. Typical amines within this class may be represented by the following general formula:

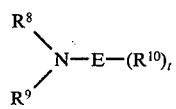

wherein E represents a carbocyclic aromatic nucleus selected from the group consisting of phenyl and naphthyl radicals; $R^8$ and $R^9$ are hydrocarbon groups containing up to about 10 carbon atoms, and preferably are lower alkyl radicals of 1 to 4 carbon atoms; $t$ is one of the following: 0, integer equal to from 1 to 5 inclusive; $R^{10}$ is a hydrocarbon group containing up to about 5 carbon atoms, and preferably is a member selected from the groups of lower alkyl and lower alkoxy radicals of 1 to 4 carbon atoms inclusive, provided that when an $R^{10}$ radical is in the ortho position, $t$ is greater than 1.

Certain secondary amines also can be used as accelerators, but care must be utilized in the selection of secondary amines since they are potent accelerators. They frequently can cause stability problems if used in too large an amount. The most desirable class of secondary amines has been found to be the class of heterocyclic secondary amines, particularly heterocyclic secondary amines containing up to about 20 carbon atoms. It also is preferred to use those amines wherein the heterocyclic ring is hydrogenated. Typical of such compounds are pyrrolidine, piperazine and 1,2,3,4-tetrahydroquinoline. Low levels of certain primary amines can be used in some cases, but rarely, if ever, can any advantage be shown over the other amines previously described.

Another highly successful class of accelerators is the organic sulfimides, i.e., organic compounds which contain the group

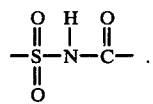

Because of the extreme effectiveness of the sulfimides as accelerators for anaerobic compositions, and because of the apparent strong interaction between the sulfimides and metal contamination, the use of the invention disclosed herein with anaerobic compositions containing organic sulfimides constitutes a highly preferred practice thereof. While the broad class of organic sulfimides can be used successfully, the sulfimides most commonly used can be represented by the formula

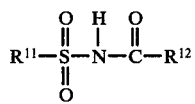

wherein each of $R^{11}$ and $R^{12}$ is a hydrocarbon group containing up to about 10 carbon atoms, and preferably up to about six carbon atoms. Naturally, $R^{11}$ and $R^{12}$ can contain any linkage or substituent which does not adversely affect the sulfimide for its intended use in the anaerobic composition. Further, $R^{11}$ and $R^{12}$ can be united to bond the sulfimide group in a heterocyclic ring, or a polynuclear heterocyclic ring system. Of the organic sulfimides, benzoic sulfimide has been found to be the most preferable.

An even more highly preferred composition is that which contains a sulfimide, particularly benzoic sulfimide, in combination with either a heterocyclic secondary amine or a tertiary N,N-dialkyl aryl amine, both of which are described above. For an expanded discussion of this type of system, reference is made to U.S. Pat. No. 3,218,305 to Krieble, issued Nov. 16, 1965.

Other less active accelerators can be used in the compositions of this invention. Typical examples of such accelerators are succinimide, phthalmide and formamide.

Routing testing easily will determine the optimum amount of accelerator which can be incorporated in a given anaerobic composition. However the following general guide lines may be used. With regard to tertiary amines, large amounts may be used if desired, up to about 8 percent by weight of the composition, or higher. However, little if any additional benefit is obtained above about 5 percent. Most preferably these tertiary amine accelerators are used at from about 1 percent to about 4 percent by weight of the anaerobic composition. The succinimide, phthalimide and formamide accelerators also can be used in significant amounts up to about 8 percent by weight of the composition, or higher, and preferably from about 1 percent to about 5 percent by weight. The sulfimide and heterocyclic secondary amine accelerators generally are used at less than about 4 percent by weight of the anaerobic composition. In the special case where a sulfimide is used in combination with a heterocyclic secondary amine of an N,N-dialkyl arylamine, the total of the two accelerators preferably does not exceed about 4 percent by weight of the anaerobic composition, and either component does not exceed about 3 percent by weight.

e. Other Ingredients

Other ingredients can be used in the anaerobic compositions of this invention, and in its preferred aspects polymerization inhibitors and latent accelerators of free radical polymerization are included. The quinones have been found to be a particularly effective class of polymerization inhibitors, and can be used herein. However, a specific sub-class of quinones has been found to form a preferrred embodiment of this invention. Specifically, those quinones which have an oxidation-reduction potential relative to the corresponding hydroquinone of less than about 0.6 volts have been found to be particularly preferred inhibitors. A treatment on the oxidation-reduction potentials of quinones may be found in Fieser and Fieser, "Organic Chemistry," 2nd Ed., 1950, D. C. Heath & Co., New York, page 752 et seq. For example, $\alpha$-naphthoquinone, $\beta$-naphthoquinone, and various derivatives thereof such as 2-methoxy-1,4-naphthoquinone, 2-hydroxy-1,4-naphthoquinone and 2,5-dimethoxy-1,4-benzoquinone meet this preferred characteristic. Contrariwise, p-benzoquinone, o-benzoquinone and diphenoquinone do not.

Other ingredients also can be used if desired to impart commercially desirable properties to the composition. Typical examples of such ingredients are thickeners, plasticizers, dyes, adhesive agents and thixotropic agents. Such materials can be used in such combinations and proportions as is desired, provided they do not affect adversely the anaerobic nature of the composition. While exceptions may exist in some cases, these materials generally do not comprise more than about 50 percent by weight of the total composition, and preferably not more than about 20 percent by weight of the composition.

The compositions disclosed herein can be prepared by any convenient process. Generally, simple addition of the chelating agent to the anaerobic composition is all that is required. It is possible in some cases that the chelating agent will not be soluble in the composition in question and it may be necessary to use a "mutual solvent"; that is, a solvent which is soluble in the anaerobic composition and which also dissolves the chelating agent. By adding the mutual solvent to the anaerobic composition, or by adding the chelating agent to the mutual solvent prior to mixing with the anaerobic composition, it frequently is possible to dissolve chelating agents which otherwise may not be useful in the anaerobic composition in question. For example, when using a chelating agent such as tetrasodium ethylenediamine tetraacetic acid, and anaerobic compositions which utilize monomers such as polyethylene glycol dimethacrylate, it commonly is desirable to dissolve the chelating agent in water or alcohol/water mixtures prior to addition to the anaerobic composition in order to effect solution thereof. Additionally, the use of mutual solvents containing ammonia or low molecular weight amines frequently aids in the dissolution of this type of chelating agent.

EXAMPLES

The following Examples are given to demonstrate the use of compositions and processes of the invention described herein in preparing and using anaerobic compositions which are markedly superior to anaerobic compositions of the prior art. These Examples are not intended to be limitations upon the scope of the invention. Unless specifically stated to the contrary, all percentages and ratios in the Examples are on a weight basis.

EXAMPLE I

An anaerobic composition was prepared by mixing the following ingredients in the following approximate weight percentages:

| Ingredient | Approximate Weight Percent |
| --- | --- |
| Polyethyleneglycol dimethacrylate (average molecular weight = 330) | 94.9 |
| Cumene hydroperoxide | 3.0 |
| Benzoic sulfimide | 1.6 |
| Dimethyl-p-toluidine | 0.5 |
| | 100.0 |

This anaerobic composition then was divided into three equal portions, the first of which was left unchanged. To each of the second and third portions of the anaerobic composition were added 300 parts per million by weight of tetrasodium ethylenediamine tetraacetic acid (hereinafter called Na$_4$EDTA). With the second portion, the Na$_4$EDTA was added singly and found to be insoluble. With the third portion, the addition of the Na$_4$EDTA was followed by the addition of 0.6% by weight of an aqueous ammonia solution (based upon the weight of the third portion), the solution containing 28% by weight NH$_3$. The Na$_4$EDTA as added to the third portion was found to be soluble.

The third portions of the anaerobic composition then were agitated for several minutes, following which the stability of a smaple of each was tested by "Standard Stability Test" described above. The stability of the first portion of anaerobic composition (containing no Na$_4$EDTA) was found to be 1 minute. The stability of the second portion (containing the insoluble form Na$_4$EDTA) was found to be 3 minutes. The stability of the third portion of anaerobic composition (containing the soluble form Na$_4$EDTA) was found to be 50 minutes.

Agitation of the three portions was continued for 1 hour, following which the Standard Stability Test was repeated on a second set of samples. In each case the results were found to be identical to those noted in the preceding paragraph.

The third portion of the anaerobic composition then was tested for anaerobic properties by placing several drops of this material between the mating threads of standard ⅜ inch-24 zinc, cadmium and steel nuts and bolts. After approximately 20 minutes, an attempt was made to move the nuts relative to the bolts by hand, and in each case the nut could not be so moved, indicating that the anaerobic composition had cured in the absence of oxygen in the mating threads of the respective nuts and bolts.

Example II

An anaerobic composition was prepared by mixing the following ingredients in the following approximate weight percentages:

| Ingredient | Approximate Weight Percent |
|---|---|
| Polyethyleneglycol dimethacrylate (average molecular weight = 330) | 96.7 |
| Cumeme hydroperoxide | 3.0 |
| Benzoic sulfimide | 0.2 |
| Dimethyl-p-toluidine | 0.1 |
| | 100.0 |

This anaerobic composition then was divided into three portions, the first of which was left unchanged. Three hundred parts per million by weight of o-aminophenol, a soluble chelator having oxygen and nitrogen ligand atoms, was added to the second portion. To the third portion was added 300 parts per million of 1,2-bis(-α-pyridylmethyleneamino)-ethane, a soluble chelator having only nitrogen ligand atoms.

Samples from these three portions of the anaerobic compositions then were used in the Standard Stability Test described above. The first portion (no chelator) was found to have a stability of about 12 minutes, whereas each of the second and third portions had a stability of about 135 minutes.

Each of the three portions of anaerobic composition then were tested on steel nuts and bolts under the "Fixture Time Test" described above to determine cure characteristics. The first portion, containing no chelator, demonstrated evidence of commencement of cure within 5 minutes, and had "fixtured" in 10 minutes. Similarly, the portion containing the o-aminophenol chelator (oxygen and nitrogen ligand atoms) showed evidence of cure with 5 minutes, and had fixtured in less than 30 minutes. By way of contrast, the portion of anaerobic sealant containing the 1,2-bis(α-pyridylmethyleneamino)-ethane chelator (nitrogen ligands only) showed no evidence of commencement of cure within 90 minutes, at which time the test was discontinued.

This test clearly demonstrates the retention of both excellent stability and excellent cure properties in the compositions of this invention.

Example III

An anaerobic composition was prepared, essentially identical to that in Example I, and was separated into three portions. No chelating agent was added to the first portion, which was used as a "Control" sample. Three hundred parts per million by weight of Na₄EDTA were added to each of the second and third portions of the anaerobic composition in combination with butylamine in the second portion, and diethylamine in the third portion. In each case, solubilization of the Na₄EDTA was effected. The butylamine and the diethylamine each was used in its portion at a 0.07T by weight level.

The three portions then were used in the Standard Stability Test, the results being as follows: Control-3 minutes; anaerobic composition with butylamine and Na₄EDTA-96 minutes; anaerobic composition with dibutylamine and Na₄EDTA-180 minutes.

Example IV

An anaerobic composition was prepared substantially identical to that used in Example I above, to which was added 300 parts per million by weight of Na₄EDTA (added as a 3% aqueous solution) and 100 parts per million by weight 1,4-naphthoquinone. In the Standard Stability Test, the product was found to have a stability of in excess of 120 minutes (at which time the test was discontinued). When tested for anaerobic cure characteristics on standard steel, cadmium and zinc nuts and bolts, the composition was found to "fixture" on each type of nut and bolt in less than 30 minutes.

We claim:

1. An anaerobic composition comprising a polymerizable acrylate ester monomer, a peroxy polymerization initiator therefor, as accelerators of free radical polymerization an organic amine and an organic sulfimide, an inhibitor of free radical polymerization selected from the class consisting of guinones having an oxidation-reduction potential of about 0.6 volt or less, said anaerobic composition having added thereto from about 1 to about 1000 parts per million by weight of said anaerobic composition of a soluble chelator having ligand atoms other than nitrogen ligand atoms of the >C=N— type.

2. The anaerobic composition of claim 1 wherein the sulfimide is benzoic sulfimide.

3. The anaerobic composition of claim 1 wherein the quinone is 1,4-naphthoquinone.

4. The anaerobic composition of claim 1 wherein the chelator is tetrasodium ethylenediamine tetraacetic acid.

5. A process of improving an anaerobic composition comprising a polymerizable acrylate monomer, a peroxy polymerization initiator therefor, as accelerators of free radical polymerization an organic amine and an organic sulfimide, an inhibitor of free radical polymerization selected from the class consisting of quinones having an oxidation-reduction potential of about 0.6 volt or less, which process comprises adding thereto from about 1 to about 1000 parts per million by weight of said anaerobic composition of a soluble chelator having ligand atoms other than nitrogen ligand atoms of the >C=N—type.

6. A process of claim 5 wherein the sulfimide is benzoic sulfimide.

7. A process of claim 5 wherein the quinone is 1,4-naphthoquinone.

8. A process of claim 5 wherein the chelator is tetrasodium ethylenediamine tetraacetic acid.

9. The composition of claim 1 wherein the acrylate ester is a polyacrylate ester of the formula

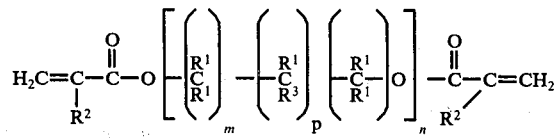

wherein R¹ represents a radical selected from the group consisting of hydrogen, lower alkyl of from 1 to about 4 carbon atoms, hydroxy alkyl of from 1 to about 4 carbon atoms, and

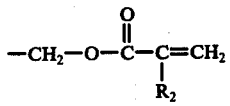

R² is a radical selected from the group consisting of hydrogen, halogen, and lower alkyl of from 1 to about 4 carbon atoms; R³ is a radical selected from the group consisting of hydrogen, hydroxyl, and

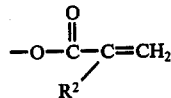

$m$ is an integer equal to at least 1, $n$ is an integer equal to at least 1, and $p$ is one of the following: 0,1.

10. The composition of claim 1 wherein the chelator has at least one non-nitrogen ligand atom.

11. The composition of claim 10 wherein the chelating agent possesses a combination of oxygen and nitrogen ligand atoms.

12. The composition of claim 1 wherein the chelating agent is selected from the class consisting of alpha and beta aminocarboxylates.

13. The composition of claim 12 wherein the chelating agent is tetrasodium ethylenediamine tetraacetic acid.

* * * * *

UNITED STATES PATENT AND TRADEMARK OFFICE
CERTIFICATE OF CORRECTION

PATENT NO. : 4,038,475
DATED : July 26, 1977
INVENTOR(S) : Elliott Frauenglass et al.

It is certified that error appears in the above—identified patent and that said Letters Patent is hereby corrected as shown below:

At Column 1, line 59: Delete the word "Wyile" and add "While."

At Column 4, line 39: After the word "speed" add the word "of".

At Column 5, Line 13: Delete the words "nitrogen ligand atoms of the $>$C=N- type".

At Column 5, Line 17: Delete the Patent No. "3,424,988" and substitute "3,425,988" in its place.

At Column 12, Line 2: Delete the letter "T" and substitute in its place "%".

At Column 11, Line 49: Delete the word "with" and substitute the word "within."

Signed and Sealed this

Fifth Day of October 1982

[SEAL]

Attest:

GERALD J. MOSSINGHOFF

Attesting Officer     Commissioner of Patents and Trademarks